Sept. 15, 1942.  J. B. HYDE  2,295,581
ANIMAL TETHER
Filed Sept. 29, 1938
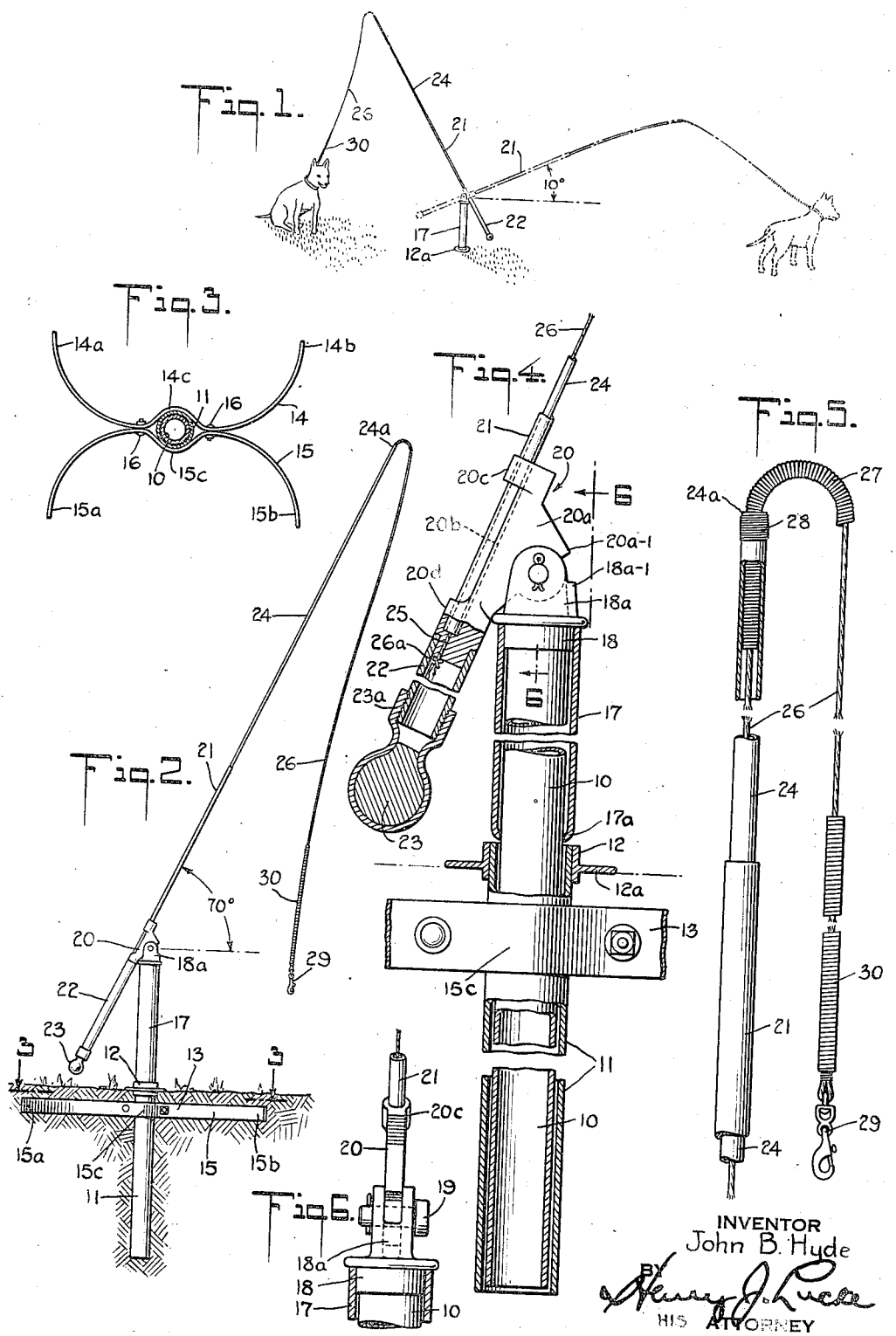
INVENTOR
John B. Hyde
BY
Henry J. Lucas
HIS ATTORNEY Patented Sept. 15, 1942

2,295,581

UNITED STATES PATENT OFFICE 2,295,581

ANIMAL TETHER

John B. Hyde, Brightwaters, N. Y.

Application September 29, 1938, Serial No. 232,329

5 Claims. (Cl. 119—117)

This invention relates to tethers for confining animals to limited areas without deprivation of freedom of movement within such limited areas.

The invention relates also to the combination of tether structure with a novel device for firmly anchoring such tether structure in the ground against lateral pull exerted by the tethered animal.

A primary object of the invention is the provision of structure for the attainment of secure and comfortable tethering while affording maximum freedom of movement for the tethered animal.

An object is the elimination of possibility of entanglement of the tethered animal in the tether structure regardless of the extent of its activity or the nature of its antics.

An object is the attainment of simple and secure anchoring of the tether structure in the ground.

An object is the provision for ready removal of the tether structure from one location of anchoring to another, as well as from the ground completely for the purpose of storage.

An important feature of the invention resides in the provision of a leash as a component part of the tether structure and of a stiffly, but flexibly, resilient carrier extending along a considerable portion of the length of the leash, the carrier being pivotally and rotatably secured to structure adapted for rigid securement, as for instance, in the ground.

Preferred embodiments of the invention include a stake for upright securement substantially centrally of the area of animal confinement, a carriage mounted on the stake for rotation substantially horizontally and for limited oscillation substantially vertically, a counter-weighted stiffly resilient hollow rod structure mounted in the carriage and extending outwardly therefrom along a considerable length, and a leash having one end secured adjacent the carriage with its length extending through the hollow of the rod structure and outwardly thereof for engagement with the animal to be tethered, such rod structure thereby acting as a carrier for the leash.

A socket may be optionally provided for insertion and maintenance within the ground, and for the reception of the stake of the tether structure.

A novel device for anchoring the stake or the socket within the ground against lateral pull exerted by activity of the animal on the leash, may be employed. Such anchoring device provides relatively long blade-like arms preferably symmetrically arranged about a substantially central insert-receiving means, the arms being advantageously curved to resist lateral movement from their embedded positions, by force exerted in any lateral direction.

Further features and objects of the invention will be apparent from the following detailed description and the accompanying drawing.

In the drawing:

Fig. 1 represents a perspective view of an animal tethered to a preferred embodiment of the invention for free movement within a limited area of confinement.

Fig. 2 represents a side elevation of the tether structure of Fig. 1, showing such structure in its position of non-use and illustrating a preferred form of the novel anchoring device of the invention.

Fig. 3 represents a horizontal section taken on line 3—3, Fig. 2.

Fig. 4 represents an enlarged fragmentary view, partly in vertical section, of the tether structure and anchoring device of Fig. 2, portions being broken out for convenience of illustration.

Fig. 5 represents an enlarged side elevation, partly in vertical section, of rod and leash portions of the tether of Fig. 2.

Fig. 6 represents a fragmentary view taken on the line 6—6 of Fig. 4.

Referring to the drawing:

Tethers, pursuant to this invention, are preferably adapted for placement centrally of a desired area of animal confinement, affording free and comfortable movement of the animal within such area, as is readily apparent from inspection of Fig. 1.

The tether structure is advantageously anchored in the ground. For this purpose a stake 10, see Fig. 4, may be employed. The stake 10 may be sunk directly into the ground, but preferably is inserted in a socket, as at 11, which has been pre-sunk for the purpose. The socket 11 may have a collar 12 secured about its upper end, the collar 12 being provided with an outwardly extending flange 12a for limiting the depth to which the socket may be sunk in the ground.

Sockets 11 may be sunk and left in the ground at a number of locations in a given area, such as a yard of a home, so that the tether structure may be conveniently inserted in and removed from the ground at a number of locations about the given area according to the whim of the person caring for the animal.

For anchoring purposes, a novel anchoring device is advantageously employed. Such device is provided with means, such as an annular portion, for receiving the article to be anchored, and with a plurality of blade-like arms extending outwardly from the receiving means. The arms may extend outwardly from a common center according to any geometrical arrangement found suitable; in the particular instance of use, for accomplishing the specified purpose of anchoring an upright against force applied laterally. The arms are advantageously curved and arranged in pairs, the component arms of each pair being curved in opposite manner and diverging outwardly for withstanding force exerted laterally on a received and anchored upright. The device is intended to be embedded in the ground about an upright sunk in the ground for securement, its location with respect to the sunk portion of the upright being preferably adjacent the surface of the ground, i. e. near the fulcrum of the lever represented by the upright. Thus, the arms resist not only the lateral component of force exerted upon the upright, but also the vertical component thereof. Because of its resistance to lateral pull exerted on the upright, the anchoring device effectively prevents enlarging of the receiving hole, formed in the earth by the upright sunk therein, and consequent loosening of the upright in the hole.

The device preferably has two similar pairs of strap-like arms extending from diametrically opposite sides of a central receiving and securing portion.

As illustrated, the anchoring device 13, provided for the reception of the socket 11 or for the stake 10 directly, conveniently comprises two oppositely configurated lengths 14 and 15 of substantially rigid strap material, preferably strap iron, secured to each other adjacent their mid portions. The lengths 14 and 15 have their ends, 14a, 14b and 15a, 15b, respectively, curved, preferably to substantially conform with the curvature of a quarter segment of a circle, and have their mid-portions 14c, 15c, respectively, curved inwardly of the curved ends, preferably to substantially conform with the curvature of a semicircle. The two lengths 14 and 15 are secured together broadside as by means of bolts 16, 16, with their curvatures directed oppositely to form an annular mid-portion and two pairs of arms extending from opposite sides of the annular mid-portion, the component arms of each pair diverging outwardly. The annular mid-portion is adapted to receive the socket 11, or the stake 10 directly, and to clamp the same in place by a tightening of the bolts 16, 16, see Fig. 3.

The anchoring device 13 is preferably laid edgewise on the surface of the ground, which may be an earth, a sod, or other yieldable type of surface, and is embedded in the ground for a distance of several inches by the force of hammer blows. Thus, broadsides of the curved lengths 14 and 15 of strap material are directed laterally to resist lateral pull in practically any direction.

The socket 11 or stake 10 may be sunk within the confines of the annular portion of the anchoring device, and sufficient earth may be removed from about the bolts 16 to permit tightening thereof in firmly securing the anchoring device to the finally positioned socket or stake. The earth may subsequently be replaced to completely surround the anchoring device and the socket or lower part of the stake.

Mounted on the top of the stake 10 is a sleeve 17 capped by a head 18 which carries upstanding yoke 18a. The head 18 is made fast in the top end of sleeve 17 either by a wedge fit, as shown, or by the use of a bolt. The insert end of cap 18 forms an end bearing surface which rests on the top of the upper end of stake 10. The lower end of sleeve 17 is preferably crimped inwardly as at 17a to fit snugly about the stake. Thus, the yoke 18a is secured to, but is yet free to rotate horizontally upon, the upper end of stake 10.

Pivotally mounted in the yoke 18a is a carriage element 20 having a depending foot 20a received and journaled by a pin 19. The carriage element 20 may have an upper bed 20b lying between spaced end members 20c and 20d. The forward end member 20c is bored to snugly receive a hollow rod 21 of stiffly resilient material such as tubular steel and the other end member 20d is partially bored, in alignment with the bore of end member 20c, to snugly receive the terminus of the hollow rod 21. Such hollow rod 21 passes through and partially lies in the bed 20b.

The end member 20d may be shouldered at its free end for receiving an end of a length of hollow tube 22 acting as a carrier for a weight element 23 of any suitable type. The weight element 23 is here illustrated as a hollow ball filled with lead and threaded to the end of tube 22 by means of a threaded socket portion 23a.

The rod 21 extends outwardly from end member 20c of the carriage 20 to serve as a reinforcing sleeve for a considerably longer hollow rod 24. The rod 24 is also of stiffly flexible material such as tubular steel but is of such diameter as to fit snugly but freely within the hollow of rod 21. Because of its length, rod 24 has a considerable degree of flexibility.

Extending through the hollow of rod 24, and passing through passage 25 formed through the closed end of end member 20d of carriage 20, for securement thereat, is a flexible leash 26, preferably a wire rope having a hemp center. Such leash 26 may be knotted or otherwise headed at its end of securement, as at 26a, and extends from the tip end 24a of the rod 24 a distance determined by the extent of the area of confinement desired. For preventing chafing of the leash 26 as it emerges from the tip end of hollow rod 24, a length of flexible tube, preferably a coil spring 27, may be provided partially within and partially without the rod 24, see Fig. 5. The tip-end 24a of the rod 24 may be reinforced as by binding with fine wire 28, to prevent splitting.

At the free end of leash 26, a fastening device, indicated generally at 29, Fig. 5, may be secured for the purpose of engaging the collar, or other similar device, of an animal desired to be tethered.

For preventing wrapping of the leash about the body of the animal when such animal rolls on the ground, a length of flexible tube, preferably a coil spring 30, may be applied as a sleeve about the portion of the leash proximate the fastening device 29. The length of such flexible tube will be determined in the particular instance by the size of the animal to be tethered.

It is desirable that the vertical oscillation of carriage 20 be limited for preventing rod 24 from obstructing movement of the animal. Accordingly, an abutment stop 18a—1 may be provided on the yoke 18a for cooperation with a stop 20a—1 formed on the foot 20a of the carriage.

By their resilient characteristics, the rods 21 and 24 function sufficiently in the nature of springs, bowed by the pull of the animal on the tether, to overcome inertia in attaining rapid return from lowered to elevated positions. The stops 18a—1 and 20a—1, which cooperate to limit downward forward movement of the carriage 20, also incidentally limit the minimum angle, which rods 21 and 24 can make with the horizontal, to such an angle as will permit the aforesaid bowing of the rods in an effective manner. Such minimum angle is advantageously 10°.

The length of the reinforcing rod 21 relative to the length of the rod 24 may vary according to particular requirements. It has been found that a length of rod 21 approximately one-third the length of rod 24 is suitable where the animal tethered is a dog of average size.

It should be noted that the rod 24 is received freely within the hollow of rod 21 for permitting a slight sliding movement of one with respect to the other during the bending or bowing of the rods. This tends to distribute stress along the lengths of both rods. Because the leash is secured adjacent the carriage and extends through the rods, the force exerted on the leash is primarily resisted at the location of the carriage, i. e., adjacent the stake, and the weight is distributed throughout the length of the rod combination.

While the herein disclosed reinforced hollow-rod is preferred as the carrier for the leash, it is within the purview of the invention to utilize a single hollow rod or any length of stiffly resilient material found suitable for the purpose.

Upward movement of the carriage 20 and the thereby carried rods 21 and 24 is desirably limited, such limitation being achieved by contact of the bottom of the end member 20d with the head 18. It is preferred that such upward movement of the carriage and rods be limited to a maximum of 70° with the horizontal.

Whereas this invention has been described with respect to one preferred embodiment thereof, it is to be clearly understood that changes may be freely made without departing from the spirit of the invention as set forth herein and in the claims that follow.

I claim:

1. A tether comprising stake means; means mounted on said stake means for rotation substantially horizontally; carriage means mounted on said horizontally rotatable means, said carriage means being pivoted for oscillation substantially vertically; counterweight means at one end of said carriage means; stop means adjacent the other end of said carriage means to limit downward movement of said other end of the carriage means; substantially rectilinear hollow flexible resilient rod means carried at one end by said carriage means and extending outwardly therefrom a distance considerable as compared with the length of said counterweight means; and a leash secured at one of its ends adjacent said carriage means and having its length extending through the hollow of said rod means and beyond the free tip-end thereof to define the radial extent of a circular area of tethering confinement.

2. A tether comprising stake means; a headed sleeve mounted on the upper end of said stake means for rotation within a substantially horizontal plane; a carriage pivotally mounted on the head of said headed sleeve for oscillation substantially vertically; counterweight means secured to one end of said carriage, said carriage being adapted to contact said headed sleeve as a limit stop for the upstroke of the oscillation of said carriage; stop means adjacent the other end of said carriage for limiting the downward stroke of the oscillation of said carriage; a long, substantially rectilinear, hollow, flexible resilient rod; a resilient reinforcing sleeve freely mounted about said hollow rod at the end adjacent said carriage and extending over a substantial portion of the length of said rod, said rod and sleeve being mounted in said carriage; and a leash secured at one end adjacent said carriage and having its length extending through the hollow of said long rod and beyond the free tip-end thereof to define the radial extent of a circular area of tethering confinement.

3. A tether as recited in claim 1 wherein a length of coil spring is disposed partially within and partially without the hollow tip-end of the hollow rod means, the leash passing through the hollow of said coil spring.

4. An animal tether comprising long, substantially rectilinear, flexible resilient rod means, including a long rod and an appreciably shorter flexible resilient sleeve snugly, but freely, fitted about said long rod at one end of said rod means; counter-weight means secured to said rod means adjacent the said one end thereof; leash means extending from the other end of said rod means; mounting means disposed intermediate the length of said rod means and adjacent its said one end; supporting means to which the said mounting means is articulatively secured so that said rod means may rotate about a substantially vertical axis and may oscillate upwardly and downwardly about a substantially horizontal axis, and limit stop means disposed for limiting the downward dip of the said other end of said rod means.

5. An animal tether as recited in claim 4 wherein the stated rod is hollow throughout its length, and wherein the stated leash is secured adjacent the stated mounting means and extends through the said rod.

JOHN B. HYDE.